United States Patent
Hong

(10) Patent No.: US 11,470,540 B2
(45) Date of Patent: Oct. 11, 2022

(54) CELL ACCESS METHOD AND CELL ACCESS APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/871,583

(22) Filed: May 11, 2020

(65) Prior Publication Data

US 2020/0275354 A1    Aug. 27, 2020

Related U.S. Application Data

(63) Continuation of application No. PCT/CN2017/111294, filed on Nov. 16, 2017.

(51) Int. Cl.
| | |
|---|---|
| *H04W 48/16* | (2009.01) |
| *H04W 48/04* | (2009.01) |
| *H04W 48/08* | (2009.01) |
| *H04W 48/20* | (2009.01) |

(52) U.S. Cl.
CPC ........... *H04W 48/16* (2013.01); *H04W 48/04* (2013.01); *H04W 48/08* (2013.01); *H04W 48/20* (2013.01)

(58) Field of Classification Search
CPC ..... H04W 48/16; H04W 48/20; H04W 48/04; H04W 48/08
See application file for complete search history.

(56) References Cited

U.S. PATENT DOCUMENTS

| | | | |
|---|---|---|---|
| 2011/0021201 A1 | 1/2011 | Lee et al. | |
| 2013/0288682 A1* | 10/2013 | Wang | ............... H04W 4/08 455/436 |
| 2014/0162636 A1 | 6/2014 | Cui et al. | |
| 2014/0194117 A1 | 7/2014 | Jeong et al. | |
| 2014/0335865 A1 | 11/2014 | Zhang et al. | |
| 2016/0255564 A1 | 9/2016 | Yang et al. | |
| 2016/0360537 A1* | 12/2016 | Palenius | ............... H04W 24/10 |
| 2017/0118778 A1* | 4/2017 | Vujcic | ................ H04W 48/12 |
| 2018/0020330 A1* | 1/2018 | Li | ............... H04B 7/08 |
| 2018/0049078 A1* | 2/2018 | Yang | ............. H04W 24/10 |
| 2018/0302260 A1* | 10/2018 | Li | ............. H04L 27/2695 |

(Continued)

FOREIGN PATENT DOCUMENTS

| | | |
|---|---|---|
| CN | 101583169 A | 11/2009 |
| CN | 101990261 A | 3/2011 |

(Continued)

OTHER PUBLICATIONS

International Search Report in the International Application No. PCT/CN2017/111294, dated Jun. 28, 2018.

(Continued)

*Primary Examiner* — Marisol Figueroa
(74) *Attorney, Agent, or Firm* — Finnegan, Henderson, Farabow, Garrett & Dunner, L.L.P.

(57) ABSTRACT

A cell access method includes: acquiring an identifier of at least one cell of one or more cells; determining a high-speed dedicated network cell in the one or more cells according to the identifier; and determining whether to access the high-speed dedicated network cell according to a current mobility state.

9 Claims, 12 Drawing Sheets

(56) References Cited

U.S. PATENT DOCUMENTS

2020/0022065 A1\* 1/2020 Yan .................. H04W 36/32
2020/0236605 A1\* 7/2020 Yiu .................. H04W 36/24

FOREIGN PATENT DOCUMENTS

| CN | 104080127 A | 10/2014 |
| CN | 104170467 A | 11/2014 |
| CN | 104219730 A | 12/2014 |
| CN | 106332197 A | 1/2017 |
| CN | 106941682 A | 7/2017 |

OTHER PUBLICATIONS

English Translation of the Written Opinion of the International Search Authority in the International Application No. PCT/CN2017/111294, dated Jun. 28, 2018.
Chinese Office Action issued by the State Intellectual Property Office (SIPO) of the People's Republic of China dated Mar. 14, 2019, in counterpart Chinese Application No. 201780001960.1.
Extended European Search Report in corresponding European Application No. 17932124.5, dated Jun. 8, 2021.

\* cited by examiner

CELL ACCESS METHOD AND CELL ACCESS APPARATUS

CROSS-REFERENCE TO RELATED APPLICATION

This application is a continuation of International Application No. PCT/CN2017/111294, filed on Nov. 16, 2017, the entire content of which is incorporated herein by reference.

TECHNICAL FIELD

The present application generally relates to the technical field of communication, and more particularly, to a cell access method, a cell access apparatus, an electronic device and a computer-readable storage medium.

BACKGROUND

To ensure communication quality of high-speed mobility user equipment, an operating company deploys a high-speed mobility device dedicated network for the high-speed mobility user equipment to access.

In an overlapping region of the high-speed mobility device dedicated network and a public network (for example, ordinary 4th-generation (4G) and 5th-generation (5G) communication networks), the high-speed mobility device dedicated network usually has higher signal strength than the public network. Since user equipment may usually select a network with higher signal strength to access, in the overlapping region, non-high-speed mobility user equipment may also access the high-speed mobility device dedicated network. Consequently, the high-speed mobility device dedicated network may be congested, and communication quality of the high-speed mobility user equipment may further be influenced.

SUMMARY

According to a first aspect of the present disclosure, a cell access method includes: acquiring an identifier of at least one cell of one or more cells; determining a high-speed dedicated network cell in the one or more cells according to the identifier; and determining whether to access the high-speed dedicated network cell according to a current mobility state.

According to a second aspect of the present disclosure, user equipment includes: a processor; and a memory for storing instructions executable by the processor. The processor is configured to acquire an identifier of at least one cell of one or more cells; determine a high-speed dedicated network cell in the one or more cells according to the identifier; and determine whether to access the high-speed dedicated network cell according to a current mobility state.

According to a third aspect of the present disclosure, a non-transitory computer-readable storage medium has stored therein instructions that, when executed by a processor of a device, cause the device to perform: acquiring an identifier of at least one cell of one or more cells; determining a high-speed dedicated network cell in the one or more cells according to the identifier; and determining whether to access the high-speed dedicated network cell according to a current mobility state.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
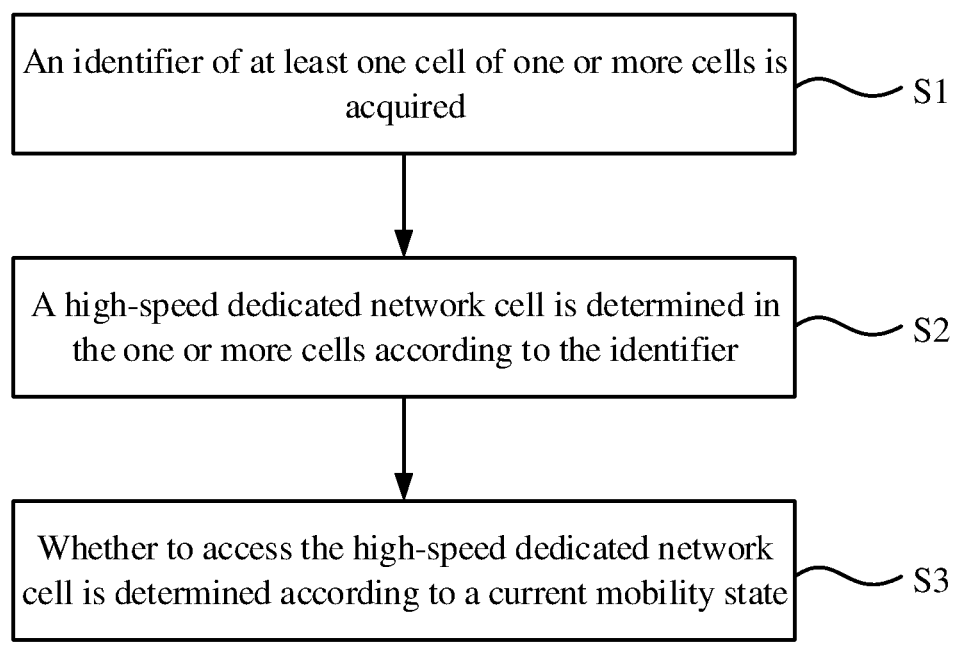
FIG. 1 is a flow chart of a cell access method, according to an embodiment of the present disclosure.

FIG. 1 is a flow chart of a cell access method, according to an embodiment of the present disclosure. The cell access method may be applied to user equipment, for example, a mobile phone, a tablet computer, and the like. As illustrated in FIG. 1, the cell access method may include the following steps.

In step S1, an identifier of at least one cell of one or more cells is acquired.

In step S2, a high-speed dedicated network cell is determined in the one or more cells according to the identifier.

In an embodiment, the one or more cells include a cell where the user equipment resides and one or more neighbor cells of the cell.

In an embodiment, the high-speed dedicated network cell and a cell in the public network have different identifiers, so that the high-speed dedicated network cell may be determined in the one or more cells according to the acquired identifier for the at least one cell if the acquired identifier of the at least one cell includes an identifier of the high-speed dedicated network cell.

In step S3, whether to access the high-speed dedicated network cell is determined according to a current mobility state.

In an embodiment, the user equipment may determine its own current mobility state. The mobility state may include multiple states. For example, two mobility states, i.e., a high-speed mobility state and a low-speed mobility state, are included. For another example, three mobility states, i.e., the high-speed mobility state, a medium-speed mobility state, and the low-speed mobility state, are included. How to determine the mobility state of the user equipment will be described below. For illustrative purposes only, it is assumed in the following embodiments that the mobility state includes two mobility states, i.e., the high-speed mobility state and the low-speed mobility state.

In an embodiment, whether to access the high-speed dedicated network cell may be determined according to a current mobility state so as to ensure that only user equipment in a specified mobility state may access the high-speed dedicated network cell. Accordingly, user equipment not in the specified mobility state may not access the high-speed dedicated network cell, avoiding congesting the high-speed mobility device dedicated network, and high communication quality of the user equipment in the specified mobility state during access to the high-speed dedicated network cell may be guaranteed.

For example, the mobility state of the user equipment includes the high-speed mobility state and the low-speed mobility state. For the user equipment in the high-speed mobility state, the acquired cell identifiers include the high-speed dedicated network cell. Since the user equipment moves along the high-speed mobility device dedicated network at a relatively high probability, it may further be determined to access the high-speed dedicated network cell, and communication service is provided for the user equipment through the high-speed mobility device dedicated network to ensure communication quality thereof. For the user equipment in the low-speed mobility state, the user equipment usually does not move along the high-speed mobility device dedicated network and moves in the public network in more cases, so that the user equipment may determine not to access the high-speed dedicated network cell. For example, the user equipment may determine to access the cell in the public network to avoid congestion of the high-speed mobility device dedicated network and prevent influence on the communication quality of the user equipment accessing the high-speed dedicated network cell in the high-speed mobility state.

Figure 2:
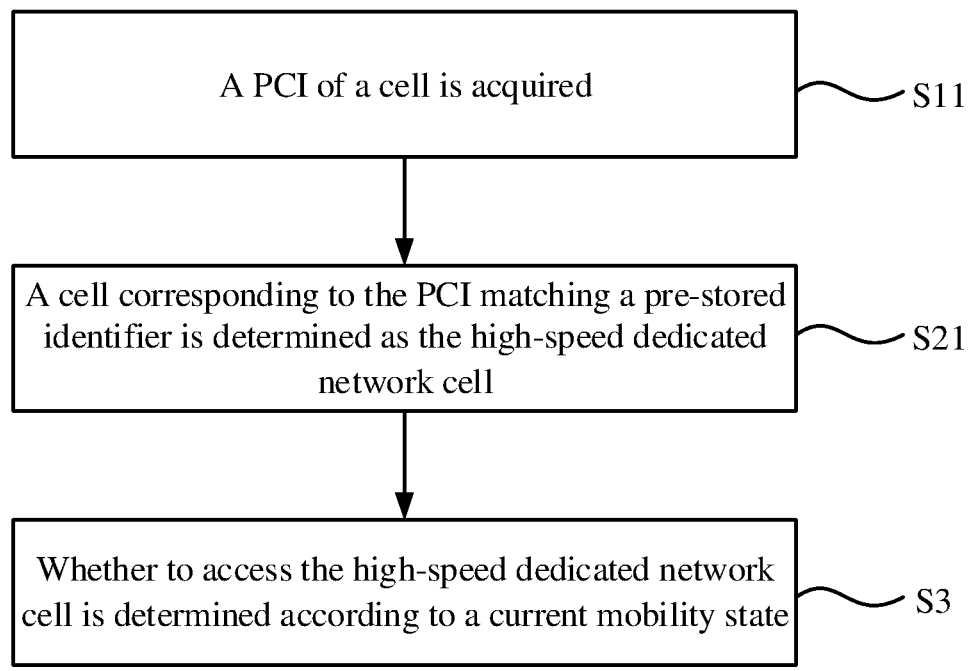
FIG. 2 is a flow chart of a cell access method, according to an embodiment of the present disclosure.

FIG. 2 is a flow chart of a cell access method, according to an embodiment of the present disclosure. As illustrated in FIG. 2, the step S1 in FIG. 1 may include step S11, where a physical cell identifier (PCI) of a cell is acquired.

The step S2 in FIG. 1 may include step S21, where a cell corresponding to the PCI matching a pre-stored identifier is determined as the high-speed dedicated network cell.

In an embodiment, the PCI of a cell may be configured for the cell by an operator through an operation administration and maintenance (OAM) system.

The PCI of the high-speed dedicated network cell is different from the PCI of the cell in the public network, and the PCI of the high-speed dedicated network cell may be pre-stored in the user equipment.

The user equipment, after acquiring the PCI of at least one cell, may compare the acquired PCI with the pre-stored identifier, determine the PCI matching the pre-stored identifier, and further determine the cell corresponding to the determined PCI as the high-speed dedicated network cell.

Figure 3:
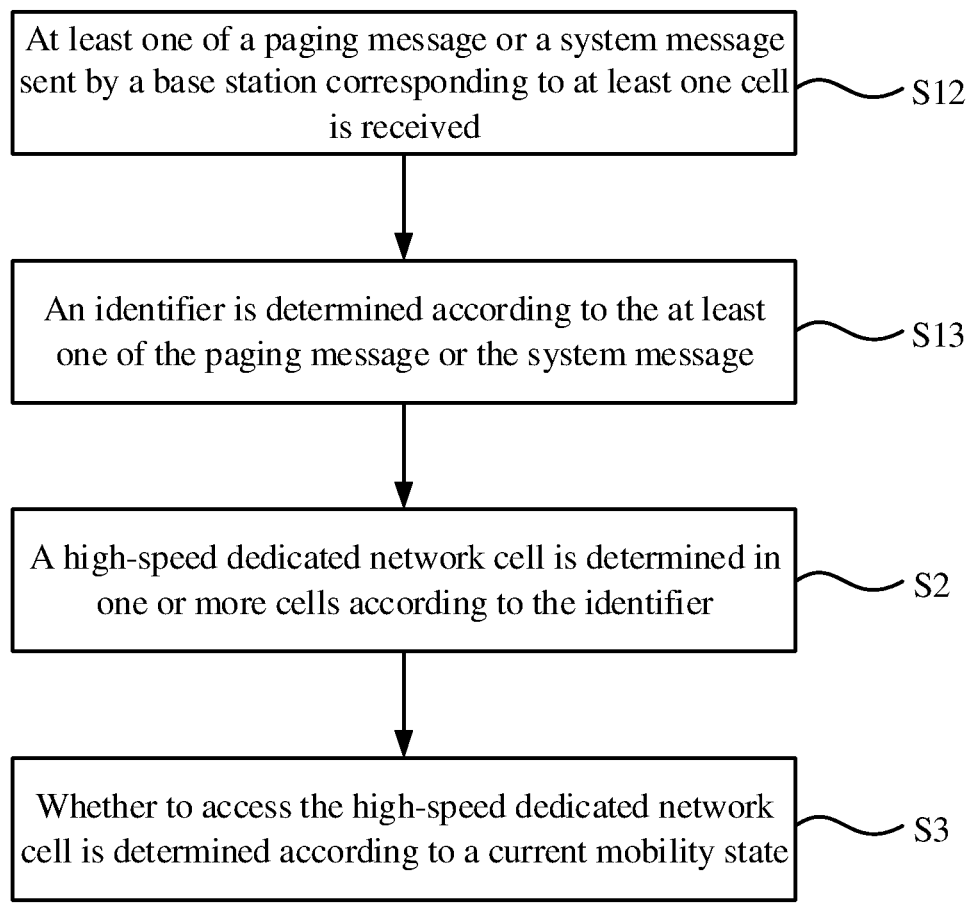
FIG. 3 is a flow chart of a cell access method, according to an embodiment of the present disclosure.

FIG. 3 is a flow chart of a cell access method, according to an embodiment of the present disclosure. As illustrated in FIG. 3, the step S1 in FIG. 1 may include the following steps.

In S12, at least one of a paging message or a system message sent by a base station corresponding to the at least one cell is received.

In S13, the identifier is determined according to the at least one of the paging message or the system message.

In an embodiment, the base station may include the identifier of the at least one cell in at least one of the paging message or the system message. The user equipment may determine the identifier through at least one of the paging message received from the base station, or the system message received from the base station.

Compared with the embodiment illustrated in FIG. 2, it is unnecessary, for the user equipment in this embodiment, to pre-store the PCI of the high-speed dedicated network cell, so that complexity in setting of the user equipment may be reduced. Based on the embodiment illustrated in FIG. 2, the paging message and system message sent by the base station are not required to include the identifier, so that complexity in setting of the message sent by the base station may be reduced. The embodiment illustrated in FIG. 2 and the embodiment illustrated in FIG. 3 may be respectively implemented as required, or they may be combined.

Figure 4:
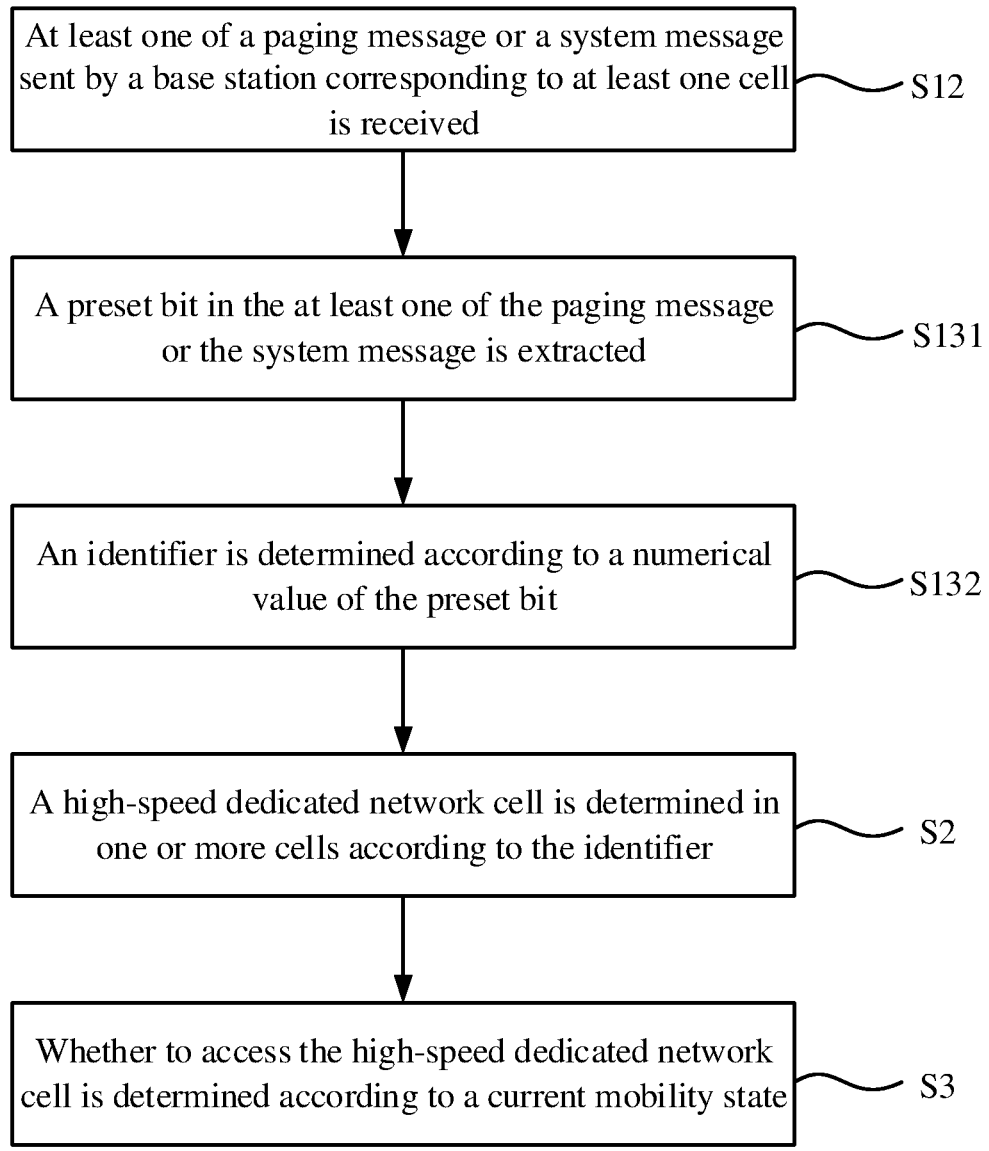
FIG. 4 is a flow chart of a cell access method, according to an embodiment of the present disclosure.

FIG. 4 is a flow chart of a cell access method, according to an embodiment of the present disclosure. As illustrated in FIG. 4, the step S13 in FIG. 3 may include the following steps.

In S131, a preset bit in the at least one of the paging message or the system message is extracted.

In S132, the identifier of the at least one cell is determined according to a numerical value of the preset bit.

In an embodiment, the base station may represent the identifier through the preset bit in the at least one of the paging message or the system message. The preset bit may be one bit, and may also be multiple bits. For example, when the preset bit is one bit, a numerical value of the bit being 1 may indicate that the cell corresponding to the base station is a high-speed dedicated network cell; and the numerical value of the bit being 0 may indicate that the cell corresponding to the base station is a cell in the public network.

Figure 5:
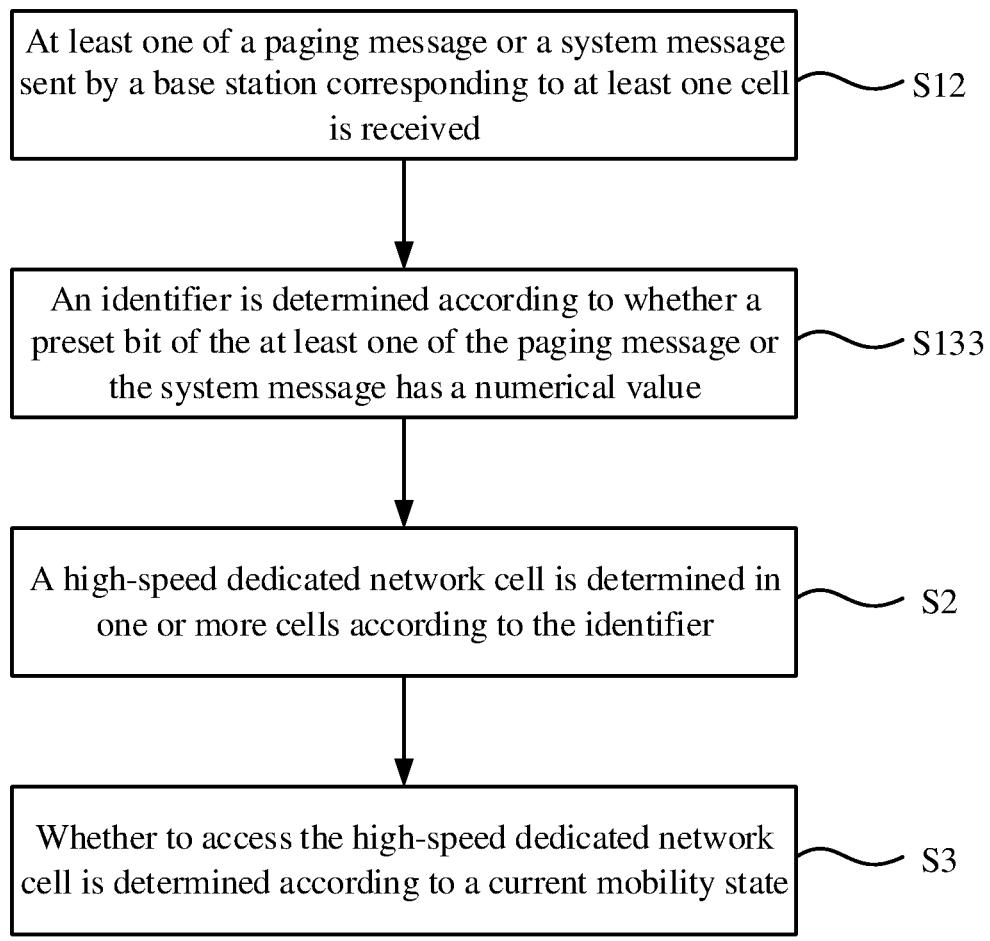
FIG. 5 is a flow chart of a cell access method, according to an embodiment of the present disclosure.

FIG. 5 is a flow chart of a cell access method, according to an embodiment of the present disclosure. As illustrated in FIG. 5, the step S13 in FIG. 3 may include step S133, where the identifier of the at least one cell is determined according to whether a preset bit of the at least one of the paging message or the system message has a numerical value.

In an embodiment, the base station may determine whether to set the preset bit in the at least one of the paging message or the system message so as to represent the identifier. For example, if the preset bit has the numerical value, namely, the preset bit being set, it may be indicated that the cell corresponding to the base station is a high-speed dedicated network cell; and if the preset bit does not have the numerical value, namely the preset bit being not set, it may be indicated that the cell corresponding to the base station is a cell in the public network. The preset bit may be one bit, and may also be multiple bits.

Figure 6:
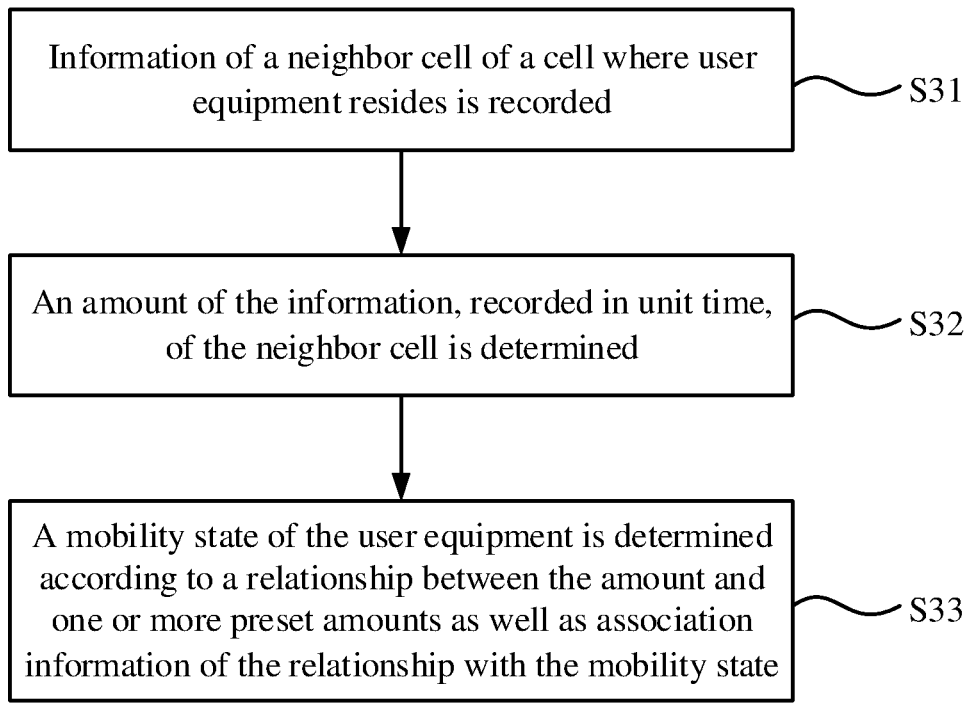
FIG. 6 is a flow chart of a method for determination of a mobility state of user equipment, according to an embodiment of the present disclosure.

FIG. 6 is a flow chart of a method for determination of a mobility state of user equipment, according to an embodiment of the present disclosure. As illustrated in FIG. 6, the step S3 in FIG. 1 may include the following steps.

In step S31, information of a neighbor cell of a cell where the user equipment resides is recorded.

In step S32, an amount of the information, recorded in unit time, of the neighbor cell is determined.

In an embodiment, the information of the neighbor cell may include at least one of: an identifier of the neighbor cell, a paging message or system message of the neighbor cell, and the like.

For example, when the information of the neighbor cell is the identifier of the neighbor cell, the user equipment may periodically detect the identifier of the neighbor cell of the cell (for example, for determining a cell suitable for access).

Figure 7:
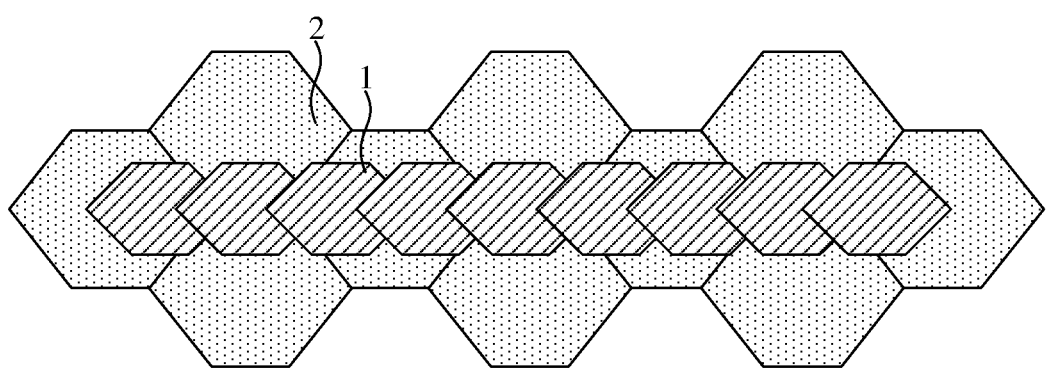
FIG. 7 is a schematic diagram illustrating a relationship between a high-speed dedicated network cell and a cell in a public network, according to an embodiment of the present disclosure.

FIG. 7 is a schematic diagram illustrating a relationship between a high-speed dedicated network cell 1 and a cell 2 in a public network, according to an embodiment of the present disclosure.

As illustrated in FIG. 7, the high-speed dedicated network cell 1 includes multiple sub-cells, and each sub-cell has the same identifier (each sub-cell may also send the same paging message and/or system message). For example, the cell where the user equipment resides is the high-speed dedicated network cell 1, and the neighbor cell detected by the user equipment is the cell 2 in the public network, neighboring to the high-speed dedicated network cell 1.

When the user equipment is in a static state, the neighbor cells of the cell where the user equipment resides may not change, and the amount of the information, recorded in the unit time, of the neighbor cell may only include the amount of information of the present neighbor cells. When the user equipment is in a moving state, the neighbor cell of the cell where the user equipment resides may change, the amount of the information, recorded in the unit time, of the neighbor cell includes the amounts of information of all neighbor cells on a moving path in the unit time, and if a mobility of the user equipment is higher, the moving path in the unit time is longer and the amount of the recorded information of the neighbor cell is larger. For example, in FIG. 7, the cell where the user equipment resides is the high-speed dedicated network cell 1, and if the mobility of the user equipment is higher, the number of identifiers, recorded in the unit time, of cells 2 in the public network is larger.

Referring back to FIG. 6, in step S33, a mobility state of the user equipment is determined according to a relationship between the amount and one or more preset amounts, as well as association information of the relationship with the mobility state.

In an embodiment, the relationship between the amount and the preset amount is different with respect to different numbers of preset amounts, and the number of corresponding mobility states of the user equipment may also be different.

For example, if the number of the preset amount is 1, a first relationship between the amount and the preset amount may be that the amount is greater than or equal to the preset amount, and a second relationship may be that the amount is less than the preset amount. A mobility state corresponding to the first relationship may be the high-speed mobility state, and a mobility state corresponding to the second relationship may be the low-speed mobility state.

For example, if the number of the preset amount is 2, i.e., a first preset amount and a second preset amount greater than the first preset amount, a first relationship between the amount and the preset amounts may be that the amount is less than the first preset amount, a second relationship may be that the amount is greater than or equal to the first preset amount and less than or equal to the second preset amount, and a third relationship may be that the amount is greater than the second preset amount. A state corresponding to the first relationship may be the low-speed mobility state, a mobility state corresponding to the second relationship may be the medium-speed mobility state, and a mobility state corresponding to the third relationship may be the high-speed mobility state.

In an embodiment, if the moving speed of the user equipment is higher, the amount of the information, recorded in the unit time, of the neighbor cell is larger; and if the moving speed is lower, the amount of the information, recorded in the unit time, of the neighbor cell is smaller. Therefore, the preset amount may be preset, and the association information of a relationship between the preset amount and the amount of the information of the neighbor cell recorded by the user equipment with the mobility state may be preset, and the mobility state of the user equipment may further be determined according to the relationship between the preset amount and the amount of the information of the neighbor cell recorded by the user equipment, as well as the association information of the relationship with the mobility state.

For example, if the amount of the information of the neighbor cell recorded by the user equipment is greater than the preset amount, it may be determined, according to the relationship, that the user equipment is in the high-speed mobility state. For example, if the amount of the information of the neighbor cell recorded by the user equipment is less than or equal to the preset amount, it may be determined, according to the relationship, that the user equipment is in the low-speed mobility state.

Based on the embodiment illustrated in FIG. 6, the mobility state of the user equipment may be accurately determined to further ensure that the user equipment may subsequently determine whether to access the high-speed dedicated network cell according to the current mobility state accurately.

It is to be noted that the one or more preset amounts and/or association information in the embodiment illustrated in FIG. 1 may be set in the user equipment, and may also be set in the base station.

Figure 8:
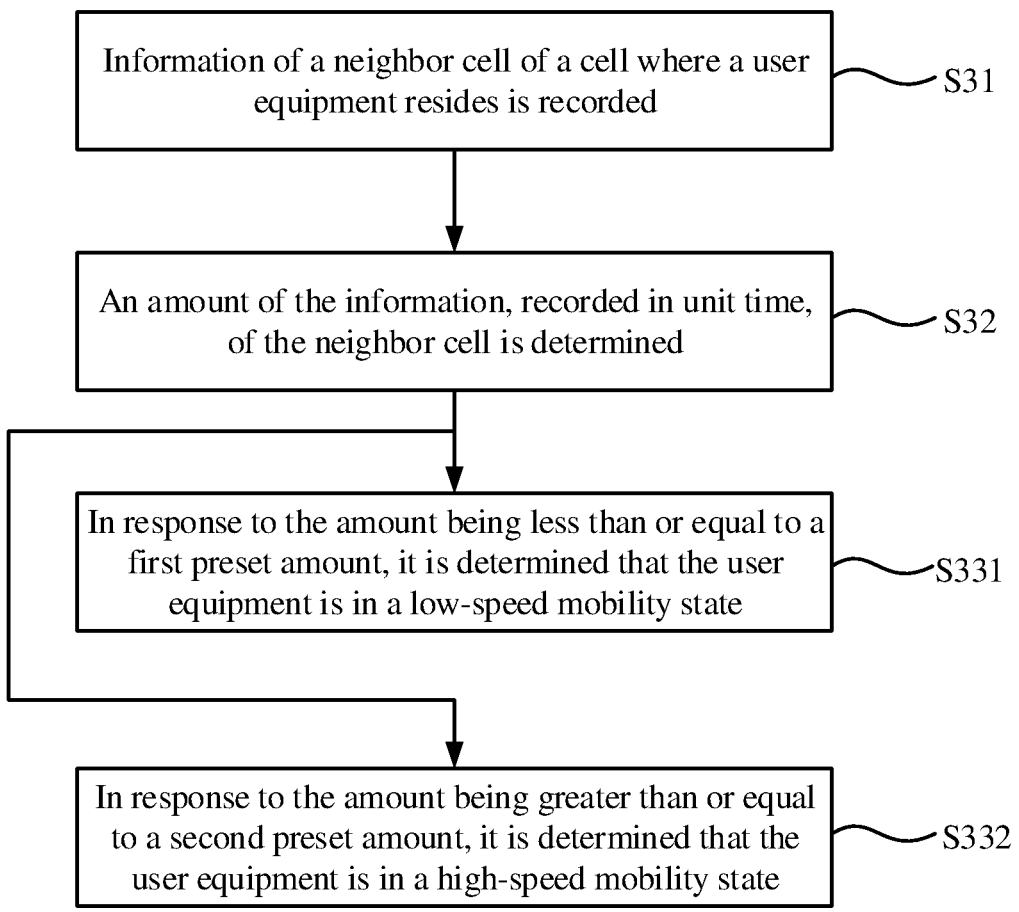
FIG. 8 is a flow chart of a method for determination of a mobility state of user equipment, according to an embodiment of the present disclosure.

FIG. 8 is a flow chart of a method for determination of a mobility state of user equipment, according to an embodiment of the present disclosure. As illustrated in FIG. 8, in a case of FIG. 6 that the one or more preset amounts include a first preset amount and a second preset amount, with the second preset amount being greater than or equal to the first preset amount, the step S33 in FIG. 6 may include the following steps.

In S331, in response to the amount being less than or equal to the first preset amount, it is determined that the user equipment is in a low-speed mobility state.

In S332, in response to the amount being greater than or equal to the second preset amount, it is determined that the user equipment is in a high-speed mobility state.

In an embodiment, if the moving speed of the user equipment is higher, the amount of the information, recorded in the unit time, of the neighbor cell is larger; and if the moving speed is lower, the amount of the information, recorded in the unit time, of the neighbor cell is smaller. The second preset amount is greater than or equal to the first preset amount. Therefore, if the amount of the information, recorded in the unit time, of the neighbor cell is greater than or equal to the second preset amount, it may be determined that the moving speed of the user equipment is relatively high, namely the user equipment is in the high-speed mobility state; and if the amount of the information, recorded in the unit time, of the neighbor cell is less than or equal to the first preset amount, it may be determined that the moving speed of the user equipment is relatively low, namely the user equipment is in the low-speed mobility state.

In an embodiment, the high-speed dedicated network includes at least one of: a high-speed railway dedicated network or a highway dedicated network.

In an embodiment, a high-speed railway dedicated network cell may include multiple sub-cells, and each sub-cell may have the same identifier; and a highway dedicated network cell may include multiple sub-cells, and each sub-cell may have the same identifier. Based on this, when the cell where the user equipment resides is a high-speed railway dedicated network cell or a highway dedicated network cell, the user equipment may identify each sub-cell as the same cell, thereby avoiding frequent cell handover during movement.

Corresponding to the embodiments of the cell access methods, the present disclosure also discloses cell access apparatus embodiments.

Figure 9:
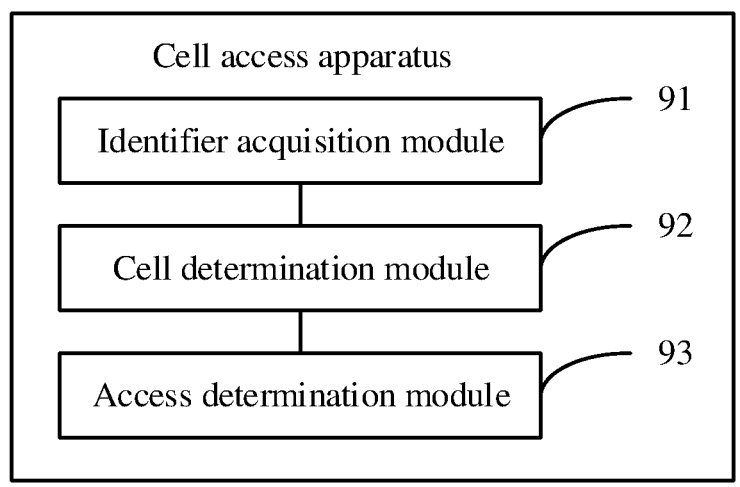
FIG. 9 is a block diagram of a cell access apparatus, according to an embodiment of the present disclosure.

FIG. 9 is a block diagram of a cell access apparatus, according to an embodiment of the present disclosure. As illustrated in FIG. 9, the cell access apparatus includes: an identifier acquisition module 91 configured to acquire an identifier of at least one cell of one or more cells; a cell determination module 92 configured to determine a high-speed dedicated network cell in the one or more cells according to the identifier; and an access determination module 93 configured to determine whether to access the high-speed dedicated network cell according to a current mobility state.

In an embodiment, the identifier acquisition module 91 is configured to acquire a PCI of a cell; and the cell determination module 92 is configured to determine a cell corresponding to the PCI matching a pre-stored identifier as the high-speed dedicated network cell.

Figure 10:
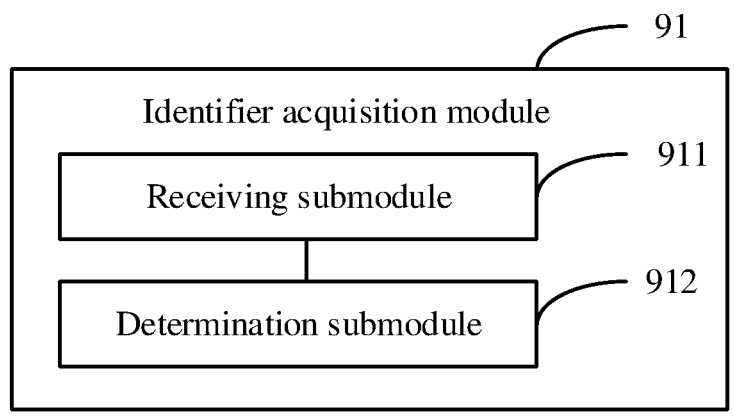
FIG. 10 is a block diagram of an identifier acquisition module, according to an embodiment of the present disclosure.

FIG. 10 is a block diagram of the identifier acquisition module 91, according to an embodiment of the present disclosure. As illustrated in FIG. 10, based on the embodiment illustrated in FIG. 9, the identifier acquisition module 91 includes: a receiving submodule 911 configured to receive at least one of a paging message or a system message sent by a base station corresponding to the at least one cell; and a determination submodule 912 configured to determine the identifier according to the at least one of the paging message or the system message.

In an embodiment, the determination submodule 912 is configured to extract a preset bit in the at least one of the paging message or the system message, and determine the identifier according to a numerical value of the preset bit.

In an embodiment, the determination submodule 912 is configured to determine the identifier according to whether a preset bit of the at least one of the paging message or the system message has a numerical value.

Figure 11:
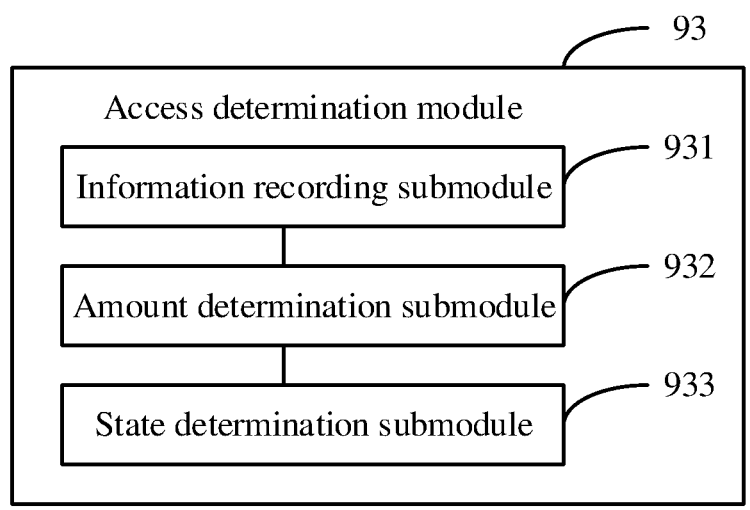
FIG. 11 is a block diagram of an access determination module, according to an embodiment of the present disclosure.

FIG. 11 is a schematic block diagram of the access determination module 93, according to an embodiment of the present disclosure. As illustrated in FIG. 11, based on the embodiment illustrated in FIG. 9, the access determination module 93 includes: an information recording submodule 931 configured to record information of a neighbor cell of a cell where the user equipment resides; an amount determination submodule 932 configured to determine an amount of the information, recorded in unit time, of the neighbor cell; and a state determination submodule 933 configured to determine a mobility state of the user equipment according to a relationship between the amount and one or more preset amounts, as well as association information of the relationship with the mobility state.

In an embodiment, the one or more preset amounts include a first amount and a second amount, the second amount being greater than or equal to the first amount, and the state determination submodule 933 is configured, in response to the amount being less than or equal to the first amount, to determine that the user equipment is in a low-speed mobility state; and in response to the amount being greater than or equal to the second amount, to determine that the user equipment is in a high-speed mobility state.

In an embodiment, the high-speed dedicated network includes at least one of a high-speed railway dedicated network or a highway dedicated network.

With respect to the device in each of the above embodiments, the specific manners for performing operations by individual modules therein have been described in detail in the embodiment regarding the method.

The device embodiments substantially correspond to the method embodiments, and thus reference for related parts may be made to descriptions of the method embodiments. The device embodiments described above are exemplary, modules described as separate parts therein may or may not be physically separated, and parts displayed as modules may be located in the same place or may also be distributed to multiple networks. Part or all of the modules therein may be selected according to a practical requirement.

Embodiments of the present disclosure also provide an electronic device, which includes: a processor; and a memory configured to store instructions executable by the processor, wherein the processor may be configured to: acquire an identifier of at least one cell of one or more cells; determine a high-speed dedicated network cell in the one or more cells according to the identifier; and determine whether to access the high-speed dedicated network cell according to a current mobility state.

Embodiments of the present disclosure also provide a computer-readable storage medium, in which a computer program is stored, the program being executed by a processor to implement the following steps: acquiring an identifier of at least one cell of one or more cells; determining a high-speed dedicated network cell in the one or more cells according to the identifier; and determining whether to access the high-speed dedicated network cell according to a current mobility state.

Figure 12:
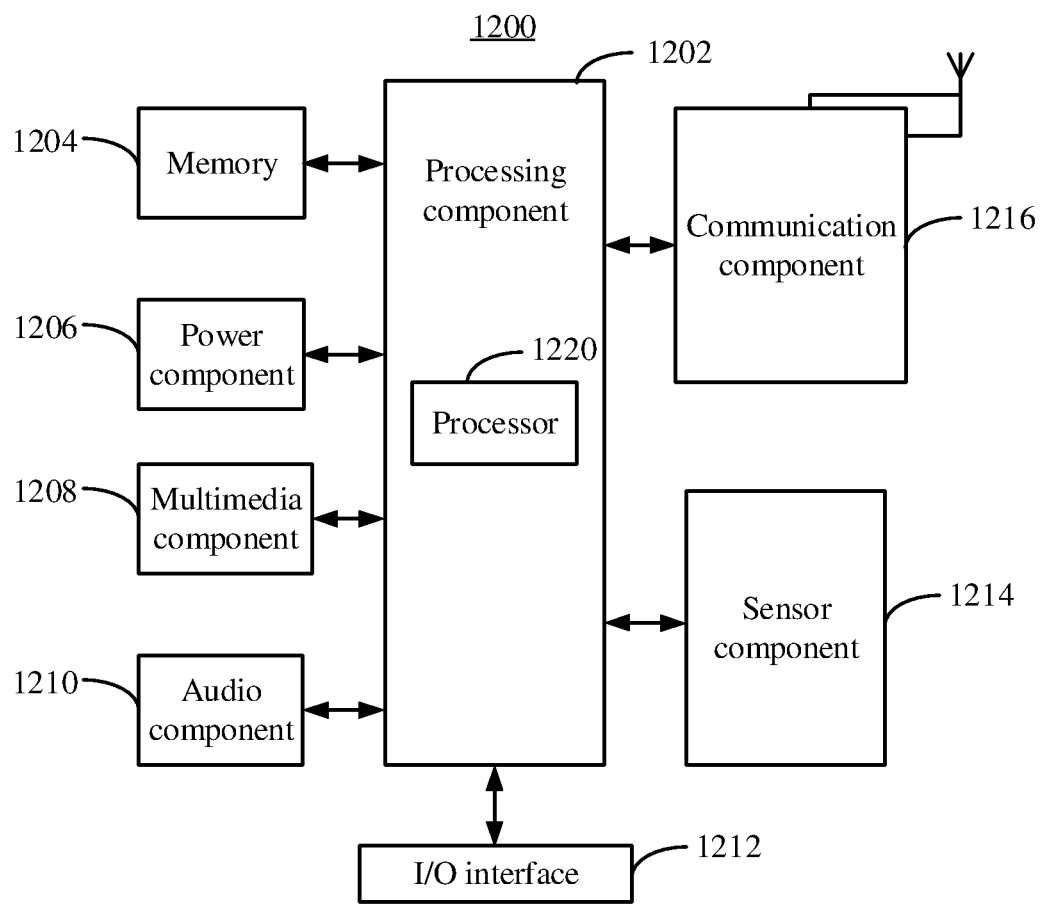
FIG. 12 is a block diagram of an apparatus for cell accessing, according to an embodiment of the present disclosure.

FIG. 12 is a block diagram of an apparatus 1200 for cell accessing, according to an embodiment of the present disclosure. For example, the apparatus 1200 may be user equipment such as a mobile phone, a computer, a digital broadcast terminal, a messaging device, a gaming console, a tablet, a medical device, exercise equipment, a personal digital assistant, and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and other components. For instance, the processing component 1202 may include a multimedia module to facilitate interaction between the multimedia component 1208 and the processing component 1202.

The memory 1204 is configured to store various types of data to support the operation of the apparatus 1200. Examples of such data include instructions for any applications or methods operated on the apparatus 1200, contact data, phonebook data, messages, pictures, video, etc. The memory 1204 may be implemented by any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, and a magnetic or optical disk.

The power component 1206 provides power to various components of the apparatus 1200. The power component 1206 may include a power management system, one or more power supplies, and other components associated with generation, management and distribution of power for the apparatus 1200.

The multimedia component 1208 includes a screen providing an output interface between the apparatus 1200 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1208 includes a front camera and/or a rear camera. The front camera and/or the rear camera may receive external multimedia data when the apparatus 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a microphone (MIC), and the MIC is configured to receive an external audio signal when the apparatus 1200 is in an operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and peripheral interface modules, such as a keyboard, a click wheel, buttons and the like. The buttons may include, but are not limited to: a home button, a volume button, a starting button and a locking button.

The sensor component 1214 includes one or more sensors configured to provide status assessments of various aspects of the apparatus 1200. For instance, the sensor component 1214 may detect an on/off status of the apparatus 1200 and relative positioning of components, such as a display and small keyboard of the apparatus 1200, and the sensor component 1214 may further detect a change in a position of the apparatus 1200 or a component of the apparatus 1200, presence or absence of contact between the user and the apparatus 1200, orientation or acceleration/deceleration of the apparatus 1200 and a change in temperature of the apparatus 1200. The sensor component 1214 may include a proximity sensor configured to detect presence of an object nearby without any physical contact. The sensor component 1214 may also include a light sensor, such as a complementary metal oxide semiconductor (CMOS) or charge coupled device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 may access a communication-standard-based wireless network, such as a wireless fidelity (WiFi) network, a 4th-generation (4G) or 5th-generation (5G) network or a combination thereof. In an exemplary embodiment, the communication component 1216 receives a broadcast signal or broadcast associated information from an external broadcast management system through a broadcast channel. In an exemplary embodiment, the communication component 1216 further includes a near field communication (NFC) module to facilitate short-range communications. In an exemplary embodiment, the communication component 1216 may be implemented based on a radio frequency identification (RFID) technology, an infrared data association (IrDA) technology, an ultra-wide band (UWB) technology, a Bluetooth (BT) technology, and other technologies.

In an exemplary embodiment, the apparatus 1200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the method of any one embodiment.

In an exemplary embodiment, there is also provided a non-transitory computer-readable storage medium including instructions, such as included in the memory 1204, executable by the processor 1220 of the apparatus 1200, for performing the above described methods. For example, the non-transitory computer-readable storage medium may be a ROM, a random access memory (RAM), a compact disc read-only memory (CD-ROM), a magnetic tape, a floppy disc, an optical data storage device, and the like.

In an embodiment, there is provided a cell access method, which may include that: an identifier of at least one cell of one or more cells is acquired; a high-speed dedicated network cell in the one or more cells is determined according to the identifier; and whether to access the high-speed dedicated network cell is determined according to a current mobility state.

In an embodiment, the acquiring the identifier of the at least one cell of the one or more cells may include: a physical cell identifier (PCI) of a cell is acquired. The determining the high-speed dedicated network cell in the one or more cells according to the identifier may include: a cell corresponding to the PCI is determined as the high-speed dedicated network cell, the PCI matching a pre-stored identifier.

In an embodiment, the acquiring the identifier of the at least one cell of the one or more cells may include: at least one of a paging message or a system message sent by a base station corresponding to the at least one cell is received; and the identifier of the at least one cell is determined according to the at least one of the paging message or the system message.

In an embodiment, the determining the identifier of the at least one cell according to the at least one of the paging message or the system message may include: a preset bit in the at least one of the paging message or the system message is extracted; and the identifier of the at least one cell is determined according to a numerical value of the preset bit.

In an embodiment, the determining the identifier of the at least one cell according to the at least one of the paging message or the system message may include: the identifier of the at least one cell is determined according to whether a preset bit of the at least one of the paging message or the system message has a numerical value.

In an embodiment, the determining whether to access the high-speed dedicated network cell according to the current mobility state may include: information of a neighbor cell of a cell where user equipment resides is recorded; an amount of the information, recorded in unit time, of the neighbor cell is determined; and a mobility state of the user equipment is determined according to a relationship between the amount and one or more preset amounts, as well as association information of the relationship with the mobility state.

In an embodiment, the one or more preset amounts may include a first amount and a second amount, and the second amount may be greater than or equal to the first amount. The determining the mobility state of the user equipment according to the relationship between the amount and the one or more preset amounts, as well as the association information of the relationship with the mobility state may include at least one of: in response to the amount being less than or equal to the first amount, it is determined that the user equipment is in a low-speed mobility state; or in response to the amount being greater than or equal to the second amount, it is determined that the user equipment is in a high-speed mobility state.

In an embodiment, the high-speed mobility device dedicated network may include at least one of: a high-speed railway dedicated network or a highway dedicated network.

In an embodiment, there is provided user equipment (UE), which may include: a processor; and a memory for storing instructions executable by the processor. The processor is configured to: acquire an identifier of at least one cell of one or more cells; determine a high-speed dedicated network cell in the one or more cells according to the identifier; and determine whether to access the high-speed dedicated network cell according to a current mobility state.

In an embodiment, the processor may further be configured to: acquire a physical cell identifier (PCI) of a cell; and determine a cell corresponding to the PCI as the high-speed dedicated network cell, the PCI matching a pre-stored identifier.

In an embodiment, the processor may further be configured to: receive at least one of a paging message or a system message sent by a base station corresponding to the at least one cell; and determine the identifier of the at least one cell according to the at least one of the paging message or the system message.

In an embodiment, the processor may further be configured to extract a preset bit in the at least one of the paging message or the system message, and determine the identifier of the at least one cell according to a numerical value of the preset bit.

In an embodiment, the processor may further be configured to determine the identifier of the at least one cell according to whether a preset bit of the at least one of the paging message or the system message has a numerical value.

In an embodiment, the processor may further be configured to: record information of a neighbor cell of a cell where the user equipment resides; determine an amount of the information, recorded in unit time, of the neighbor cell; and determine a mobility state of the user equipment according to a relationship between the amount and one or more preset amounts, as well as association information of the relationship with the mobility state.

In an embodiment, the one or more preset amounts may include a first amount and a second amount; and the second amount may be greater than or equal to the first amount. The processor may further be configured to perform at least one of: in response to the amount being less than or equal to the first amount, determining that the user equipment is in a low-speed mobility state, or in response to the amount being greater than or equal to the second amount, determining that the user equipment is in a high-speed mobility state.

In an embodiment, there is provided a non-transitory computer-readable storage medium having stored therein instructions that, when executed by a processor of a device, cause the device to perform a cell access method. The method may include: an identifier of at least one cell of one or more cells is acquired; a high-speed dedicated network cell in the one or more cells is determined according to the identifier; and whether to access the high-speed dedicated network cell is determined according to a current mobility state.

In an embodiment, the acquiring the identifier of the at least one cell of the one or more cells may include: a physical cell identifier (PCI) of a cell is acquired. The determining the high-speed dedicated network cell in the one or more cells according to the identifier may include: a cell corresponding to the PCI is determined as the high-speed dedicated network cell, the PCI matching a pre-stored identifier.

In an embodiment, the acquiring the identifier of the at least one cell of the one or more cells may include: at least one of a paging message or a system message sent by a base station corresponding to the at least one cell is received; and the identifier of the at least one cell is determined according to the at least one of the paging message or the system message.

In an embodiment, the determining the identifier of the at least one cell according to the at least one of the paging message or the system message may include: a preset bit in the at least one of the paging message or the system message is extracted; and the identifier of the at least one cell is determined according to a numerical value of the preset bit.

In an embodiment, the determining the identifier of the at least one cell according to the at least one of the paging message or the system message may include: the identifier of the at least one cell is determined according to whether a preset bit of the at least one of the paging message or the system message has a numerical value.

Other implementations of the present disclosure will be apparent to those skilled in the art from consideration of the specification and practice of the present disclosure. The disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A cell access method applied to user equipment, the method comprising:
acquiring an identifier of at least one cell in a plurality of cells, wherein the identifier of the at least one cell is a physical cell identifier (PCI) configured by an operator through an operation administration and maintenance (OAM) system, and a PCI of a high-speed dedicated network cell is different from a PCI of a cell in a public network;
determining the PCI of the at least one cell matching a pre-stored identifier, and further determining the at least one cell as the high-speed dedicated network cell; and
in response to determining that the at least one cell is the high-speed dedicated network cell, determining whether or not to access the high-speed dedicated network cell according to a current mobility state of the user equipment;
wherein the determining whether or not to access the high-speed dedicated network cell according to the current mobility state of the user equipment comprises:
recording information of a neighbor cell of a cell where the user equipment resides;
determining an amount of the information, recorded in unit time, of the neighbor cell; and
determining a mobility state of the user equipment according to a relationship between the amount and one or more preset amounts, as well as association information of the relationship with the mobility state;
wherein the one or more preset amounts comprise a first amount and a second amount, and the second amount is greater than or equal to the first amount;
wherein the determining the mobility state of the user equipment according to the relationship between the amount and the one or more preset amounts, as well as the association information of the relationship with the mobility state comprises, in response to the amount being less than or equal to the first amount, determining that the user equipment is in a low-speed mobility state.

2. The cell access method of claim 1, wherein the high-speed dedicated network cell comprises at least one of:
a high-speed railway dedicated network cell or a highway dedicated network cell.

3. The cell access method of claim 1, wherein the information of the neighbor cell includes at least one of: an identifier of the neighbor cell, a paging message of the neighbor cell, or a system message of the neighbor cell.

4. User equipment, comprising:
a processor; and
a memory for storing instructions executable by the processor;
wherein the processor is configured to:
acquire an identifier of at least one cell in a plurality of cells, wherein the identifier of the at least one cell is a physical cell identifier (PCI) configured by an operator through an operation administration and maintenance (OAM) system, and a PCI of a high-speed dedicated network cell is different from a PCI of a cell in a public network;
determine the PCI of the at least one cell matching a pre-stored identifier, and further determine the at least one cell as the high-speed dedicated network cell; and
in response to determining that the at least one cell is the high-speed dedicated network cell, determine whether or not to access the high-speed dedicated network cell according to a current mobility state of the user equipment;
wherein the processor is further configured to:
record information of a neighbor cell of a cell where the user equipment resides;
determine an amount of the information, recorded in unit time, of the neighbor cell; and
determine a mobility state of the user equipment according to a relationship between the amount and one or more preset amounts, as well as association information of the relationship with the mobility state;
wherein the one or more preset amounts comprise a first amount and a second amount, and the second amount is greater than or equal to the first amount;
wherein the processor is further configured to, in response to the amount being less than or equal to the first amount, determining that the user equipment is in a low-speed mobility state.

5. The user equipment of claim 4, wherein the high-speed dedicated network cell comprises at least one of:
a high-speed railway dedicated network cell or a highway dedicated network cell.

6. The user equipment of claim 4, wherein the information of the neighbor cell includes at least one of: an identifier of the neighbor cell, a paging message of the neighbor cell, or a system message of the neighbor cell.

7. A non-transitory computer-readable storage medium having stored therein instructions that, when executed by a processor of user equipment, cause the user equipment to perform a cell access method, the method comprising:
acquiring an identifier of at least one cell in a plurality of cells, wherein the identifier of the at least one cell is a physical cell identifier (PCI) configured by an operator through an operation administration and maintenance (OAM) system, and a PCI of a high-speed dedicated network cell is different from a PCI of a cell in a public network;
determine the PCI of the at least one cell matching a pre-stored identifier, and further determine the at least one cell is the high-speed dedicated network cell; and
in response to determining that the at least one cell is the high-speed dedicated network cell, determining whether or not to access the high-speed dedicated network cell according to a current mobility state of the user equipment;
wherein the determining whether or not to access the high-speed dedicated network cell according to the current mobility state of the user equipment comprises:
recording information of a neighbor cell of a cell where the user equipment resides;
determining an amount of the information, recorded in unit time, of the neighbor cell; and
determining a mobility state of the user equipment according to a relationship between the amount and one or more preset amounts, as well as association information of the relationship with the mobility state;
wherein the one or more preset amounts comprise a first amount and a second amount, and the second amount is greater than or equal to the first amount;

wherein the determining the mobility state of the user equipment according to the relationship between the amount and the one or more preset amounts, as well as the association information of the relationship with the mobility state comprises, in response to the amount being less than or equal to the first amount, determining that the user equipment is in a low-speed mobility state.

8. The non-transitory computer-readable storage medium of claim 7, wherein the high-speed dedicated network cell comprises at least one of:

a high-speed railway dedicated network cell or a highway dedicated network cell.

9. The non-transitory computer-readable storage medium of claim 7, wherein the information of the neighbor cell includes at least one of: an identifier of the neighbor cell, a paging message of the neighbor cell, or a system message of the neighbor cell.

* * * * *